(12) United States Patent
Toncelli

(10) Patent No.: US 7,240,415 B2
(45) Date of Patent: Jul. 10, 2007

(54) MACHINE FOR PROCESSING MATERIAL IN THE FORM OF SLABS, IN PARTICULAR NATURAL STONE MATERIAL, CERAMIC MATERIAL AND CONGLOMERATE

(76) Inventor: Dario Toncelli, Via San Pancrazio 3, 36061 Bassano del Grappa (Vicenza) (IT)

( * ) Notice: Subject to any disclaimer, the term of this patent is extended or adjusted under 35 U.S.C. 154(b) by 0 days.

(21) Appl. No.: 11/156,248

(22) Filed: Jun. 17, 2005

(65) Prior Publication Data
US 2005/0288161 A1 Dec. 29, 2005

(30) Foreign Application Priority Data
Jun. 23, 2004 (IT) .......................... MI20040309 U

(51) Int. Cl.
*B23C 1/12* (2006.01)
*B23C 1/08* (2006.01)
*B23C 1/04* (2006.01)
*B23B 35/00* (2006.01)

(52) U.S. Cl. ........................ 29/563; 409/202; 409/213; 408/1 R

(58) Field of Classification Search .................. 29/563, 29/33 P, 560, 430, 429, 33 R, 26 R, 27 R; 409/202, 212, 201, 203, 211, 213, 216, 217, 409/235, 165; 83/939, 940, 941; 408/1 R, 408/3, 42, 43, 46, 234, 237, 16
See application file for complete search history.

(56) References Cited
U.S. PATENT DOCUMENTS
3,776,072 A 12/1973 Gerber et al.

3,823,645 A * 7/1974 Sukhov et al. .............. 409/202

(Continued)

FOREIGN PATENT DOCUMENTS
CH 677 897 7/1991

(Continued)

OTHER PUBLICATIONS

Clarence R. Styron III "A Preview of Methods for Cutting Concrete" Proceedings of the Second U.S. Water Jet Conference, May 24-26, 1983.

(Continued)

*Primary Examiner*—Dana Ross
(74) *Attorney, Agent, or Firm*—Katten Muchin Rosenman LLP

(57) ABSTRACT

A machine for processing, in particular for cutting workpieces in the form of slabs, comprises a spindle (36) slidably supported by a beam (32) displaceable transversely with respect to the longitudinal direction of a working surface (12). The beam is in turn slidably supported at its ends by two bridge structures (22, 24) situated at the two ends of said working surface. The spindle (36) is rotatably adjustable through 360° about its vertical axis and supports a disk cutting tool (60) which may be secured thereon or picked from a tools magazine also comprising other tools and a plurality of cutting heads. When other tools are used, allows other machining operations than cutting can be performed by the machine. The working surface consists of a conveyor belt (14) made of rubber, in particular disposable rubber, and is supported at the bottom by a fixed metal surface. The machine according to the invention is suitable for insertion along a continuous processing line.

5 Claims, 7 Drawing Sheets

U.S. PATENT DOCUMENTS

| | | | |
|---|---|---|---|
| 3,860,371 A * | 1/1975 | Willy | 425/115 |
| 3,877,334 A | 4/1975 | Gerber | |
| 4,018,032 A * | 4/1977 | Dempsey et al. | 53/247 |
| 4,112,797 A | 9/1978 | Pearl | |
| 4,204,448 A | 5/1980 | Pearl | |
| 4,309,600 A | 1/1982 | Perry et al. | |
| 4,312,254 A | 1/1982 | Pearl | |
| 4,436,078 A | 3/1984 | Bourke | |
| 5,003,729 A | 4/1991 | Sherby | |
| 5,349,788 A | 9/1994 | Nedo et al. | |
| 5,472,367 A | 12/1995 | Slocum et al. | |
| 5,782,673 A | 7/1998 | Warehime | |
| 5,934,346 A | 8/1999 | Windeisen et al. | |
| 6,006,735 A | 12/1999 | Schlough et al. | |
| 6,222,155 B1 | 4/2001 | Blackmon et al. | |
| 6,254,317 B1 * | 7/2001 | Chang | 409/212 |
| 6,306,015 B1 | 10/2001 | Bushell | |
| 6,332,386 B1 * | 12/2001 | Popp | 409/201 |
| 6,540,454 B2 * | 4/2003 | Tanaka et al. | 409/201 |
| 6,719,506 B2 * | 4/2004 | Chang et al. | 409/202 |
| 2002/0131836 A1 * | 9/2002 | Ferrari et al. | 409/202 |
| 2004/0194569 A1 * | 10/2004 | Hermoso | 74/490.01 |

FOREIGN PATENT DOCUMENTS

| | | |
|---|---|---|
| DE | 43 32 630 | 3/1995 |
| DE | 196 03 933 | 8/1997 |
| EP | 0 684 340 | 11/1995 |
| EP | 1 136 215 | 9/2001 |
| FR | 2 548 073 | 1/1985 |
| JP | 55-125417 | 9/1980 |
| JP | 2003-314998 | 11/2003 |
| WO | WO 200272308 A1 * | 9/2002 |
| WO | 2005/014252 | 2/2005 |

OTHER PUBLICATIONS

International Search Report dated Jul. 26, 2005.
Written Opinion of the International Searching Authority dated Jul. 26, 2005.

* cited by examiner

MACHINE FOR PROCESSING MATERIAL IN THE FORM OF SLABS, IN PARTICULAR NATURAL STONE MATERIAL, CERAMIC MATERIAL AND CONGLOMERATE

The present invention concerns the cutting and surface-machining of stone material and more specifically a numerical-control machine for the cutting and surface-machining of stone material, ceramic material and agglomerates thereof.

In the description reference will be made to the cutting of slabs of stone material (such as marble, granite and agglomerate stone or ceramic material), it being understood that this description is not intended to be limiting.

It is known that the production line for workpieces such as slabs, panels, tiles, wainscoting, and kitchen and bathroom furniture surfaces or "tops", envisages that the starting stone material, extracted from quarries or mines in the form of blocks, undergoes a first sawing operation from which rough large-size slabs are obtained, these slabs being then transferred for subsequent machining operations including also reduction in the form of tiles, strips, panels or wainscoting.

When, moreover, particular articles must be produced, such as the already mentioned kitchen and bathroom tops, in addition to the cutting operations, the operations of forming holes for seating the taps and fittings, openings for fitting washbasins, etc., are also performed.

A problem which often arises in connection with the rough-formed slabs mentioned above is that the said slabs may have imperfections or defects, such as, for example, partial fissures or flaws which must also be taken into account during the subsequent reduction into cut-to-size elements, eliminating them during the cutting operations for achieving the aforementioned reduction, in order to prevent the production of reject parts.

Machines able to perform automated cuts using cutting methods which are optimized depending both on the type of slab to be cut and the type of finished product desired are known and widely used.

These machines are usually associated with devices for automatically handling the workpiece to be machined and the associated finished product and with systems for detecting the profile, the dimensions and the arrangement of the slabs as well as the presence or absence and location of defects.

A first type of machine (such as, for example, the "Multibreton CAT", which is produced and marketed by Breton S.p.A.) is a machine for purely performing mutually perpendicular cuts, namely a machine with two cutting spindles, which is neither numerically controlled nor equipped with a system for interpolation of the axes.

This machine substantially comprises a fixed conveyor-belt bench and two lateral bridge-type support structures which are arranged transversely with respect to the two ends in the longitudinal direction of the bench and underneath which a belt supporting the slab being machined is movable. A beam is integral with the two bridge-type structures and at its two ends is able to slide along the said structures so that it may be moved perpendicularly with respect to the longitudinal direction of the bench.

Two cutting spindles with a cutting disk mounted on their bottom end are slidably integral with the beam.

The bottom end of the spindle is rotatable about a vertical axis, with rotations through 90°, so as to allow the cutting disk to be arranged both parallel and perpendicular to the aforementioned longitudinal direction of the bench which is also the direction along which the slabs are fed on the bench.

The machine is equipped with a device for detecting the profile of each slab, said device being mounted at the upstream end of the bench.

Owing to a dedicated software, the cutting cycle is set according to the profile of the slab to be cut and the slabs/tiles/wainscoting to be obtained, so that this cycle is optimized, reducing the cutting waste as far as possible.

In another type of cutting machine (such as, for example, the "Multibreton TAP", also produced and marketed by Breton S.p.A.), the machine structure briefly described above is modified so as to include a plurality of spindles which, however, are not rotating, while the conveyor-belt bench is rotatable through 90° in order to bring the material being machined into engagement with the spindle or spindles.

Therefore, at the present time, it is substantially possible to perform mainly cuts which are parallel with and/or perpendicular to the direction along which the material being machined is fed.

In any case, the machines briefly described above require contouring apparatus which are not suitable for insertion in a continuous processing line, namely a line which, starting with the rough-formed slab obtained from sawing, terminates at the other end in unloading of a finished product or article.

Likewise, at the present time, any machining operation other than cutting of the rough-formed slabs must be performed using other machines, such as, for example, numerically controlled contouring machines with interpolated axes.

In this case also, these are machines not suitable for insertion along a continuous processing line which in addition have a bench equipped with suction pads for temporarily fixing the workpieces to be machined. In the more advanced variant, the benches are two in number and may alternately be brought into the working zone so that, while machining is being performed on one bench, the finished articles are unloaded from the other bench and the suction pads are repositioned and the new workpieces to be machined are deposited.

The main object of the present invention is to provide a machine for processing rough-formed slabs, able to perform, firstly and principally, cuts oriented in any manner with respect to the direction along which the material to be machined is fed and, secondly, to combine with the cutting operations other operations, such as forming holes or receiving apertures, the machine being able to be inserted along a continuous processing line at the upstream end of which a rough-formed slab is loaded, while at the downstream end of the line articles are collected which are partly or totally finished.

The abovementioned object is achieved by a machine for processing workpieces in slab form, chosen from among natural stone materials, ceramic materials and agglomerates, of the type comprising a working surface for supporting the rough-formed slab to be machined, two bridge structures mounted at the respective ends of the said working surface perpendicularly with respect to the longitudinal direction of the working surface, a cross-member extending between the said two bridge structures and mounted slidably thereon so as to perform displacements perpendicularly with respect to said longitudinal direction, and a spindle with a vertical axis of rotation, movable vertically with respect to the working surface and mounted slidably on said cross-member, said spindle having at its bottom end at least one machining tool, characterized in that said at least one tool is a cutting disk, rotatable through an angle of 360°, but adjustable with respect to said vertical axis of rotation of said spindle, and said working surface consists of a conveyor belt with a rubber-lined surface able to receive the incisions due to the cutting disk and movable in a direction perpendicular to said bridge structures so as to allow in a continuous and automatic manner feeding of the workpieces to be machined into a position where they may be engaged by the tool mounted on said spindle and unloading of the finished parts.

In a preferred embodiment of the machine according to the present invention, said machine is also provided with a tools magazine comprising, in addition to said cutting disk and the associated drive unit for transmission of rotational movement, other tools needed for further machining of the rough-finished workpieces resulting from the action of said cutting disk, the said bottom end of the spindle being provided with means for automatically changing the tools housed inside the magazine.

In the machine according to the present invention said cutting disk may be permanently associated with said bottom end of the spindle, in which case, in addition to being rotatable through 360°, though adjustable about the vertical axis of the spindle in order to take any desired position with respect to said vertical axis and with respect to the surface supporting the workpiece being machined, the cutting disk is also rotatable about a horizontal axis so as to be continuously rotatable between 0 and 90° on a plane passing through the axis of said spindle.

As it will appear from the following detailed description, provided in connection with the accompanying drawings, thanks to the machine according to the present invention any cutting operation can be performed, also with an orientation oblique with respect to the longitudinal direction of said supporting surface.

If the aforementioned tools magazine is present, by mounting on the spindle the appropriate tool taken from the said magazine, further machining operations can take place along the processing line without it being necessary to transfer the semi-finished workpieces resulting from the cutting operation to different machines.

In particular, operations immediately following that involving cutting of the rough-formed slabs can be performed. For example, in the case of kitchen tops, where the cutting operation consists in cutting the external contour of the slab and reducing the latter to the desired dimensions, the following operations can be performed: an internal cut, preferably having a curved or circular profile, for subsequent insertion of washbasins; boring holes for mounting taps and fittings; forming undercuts and/or inclined cuts in the thickness to permit that several sections are joined together.

In the accompanying drawings:

FIG. 5A shows a detail of FIG. 5; and

Figure 1:
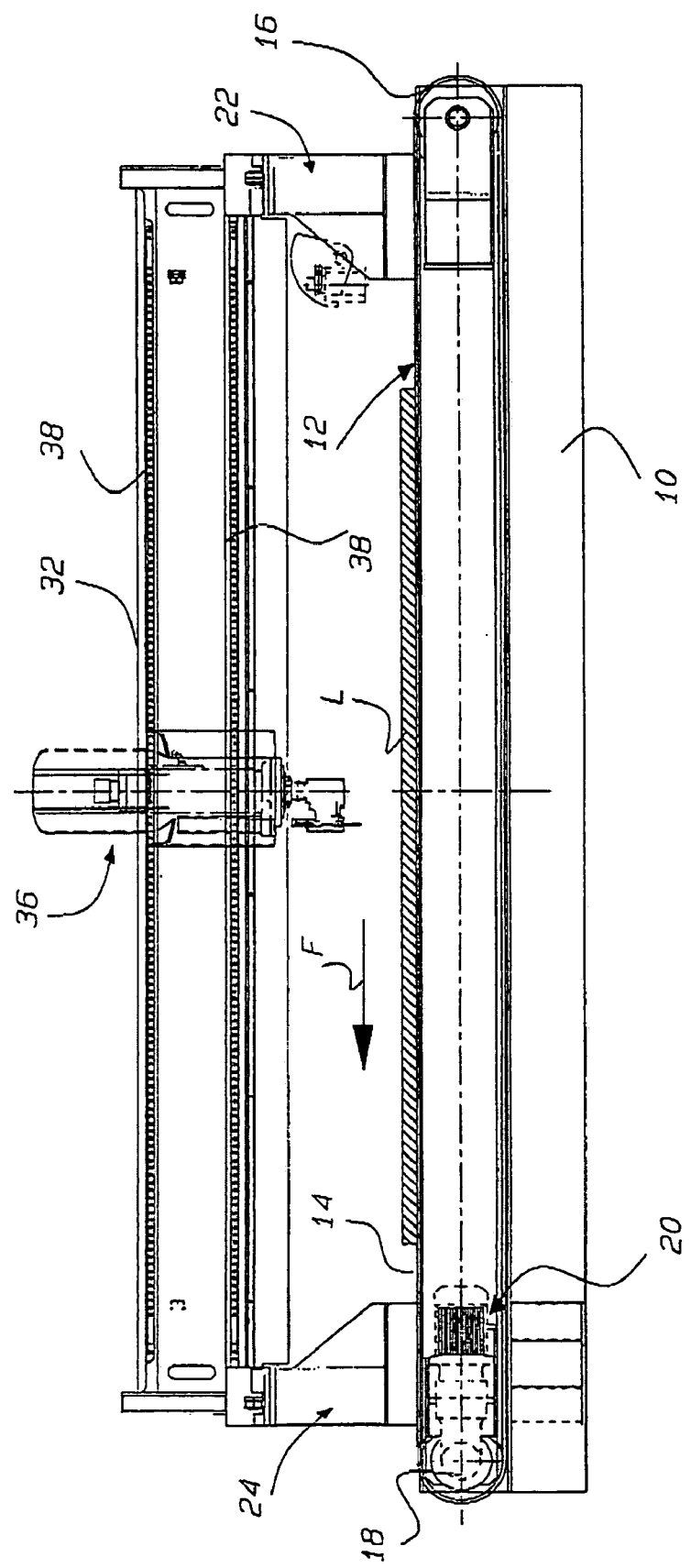
FIG. 1 is a side elevation view, partially sectioned, of the machine according to the invention equipped with a tools magazine.
Figure 2:
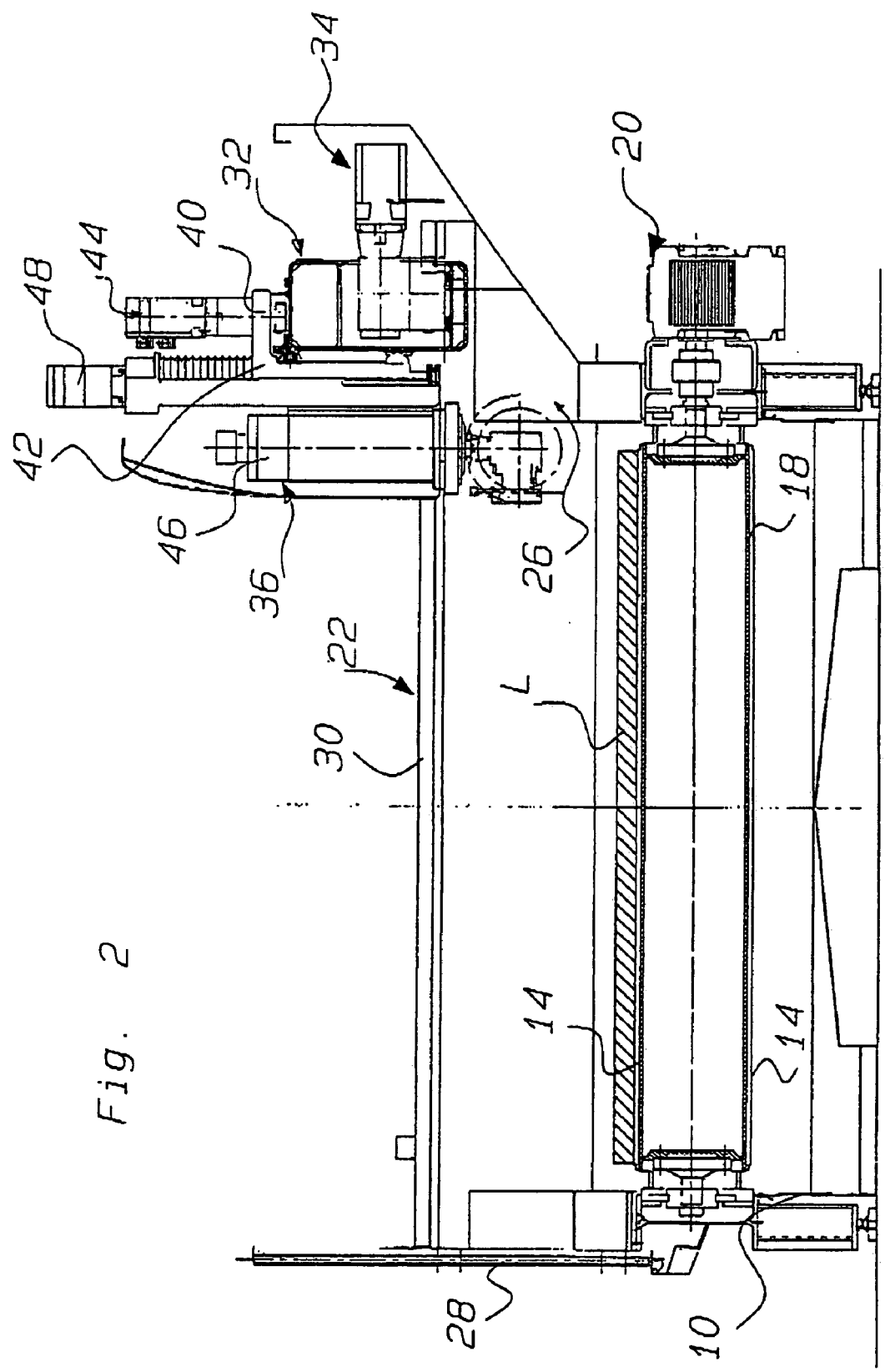
FIGS. 2 and 3 are, respectively, an end view and a top view of the machine according to FIG. 1.
Figure 3:
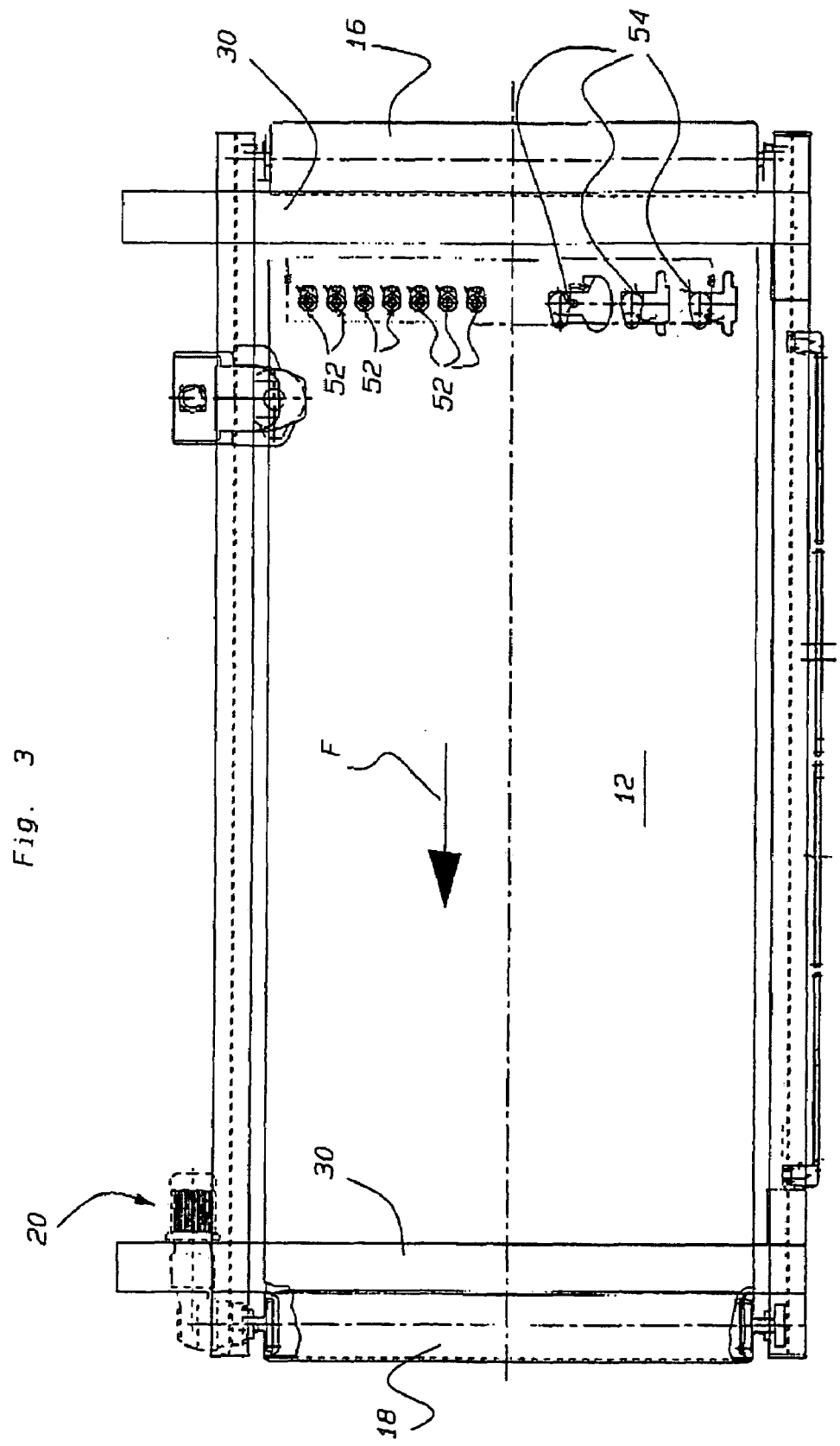
Figure 4:
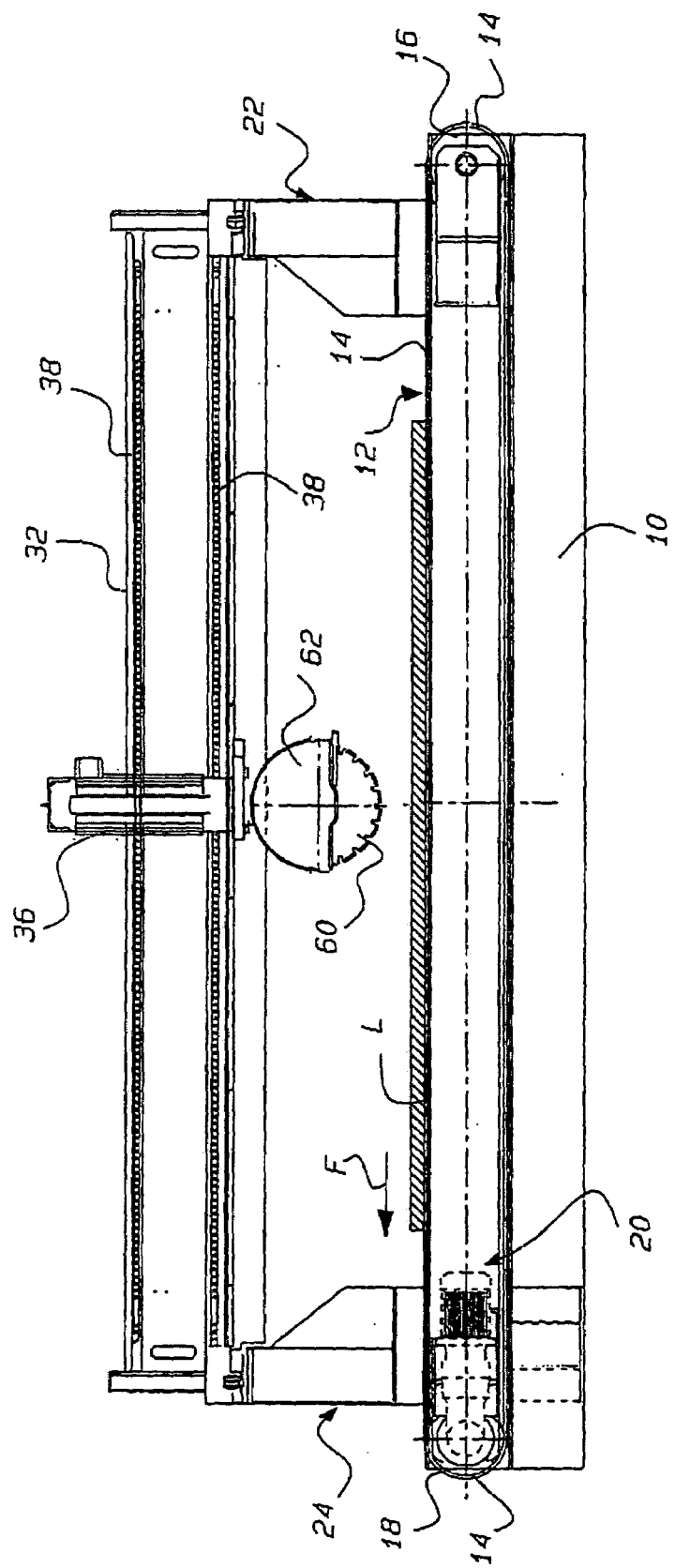
FIG. 4 is a side elevation view of the machine according to FIG. 1 equipped with a permanently attached cutting disk.
Figure 5:
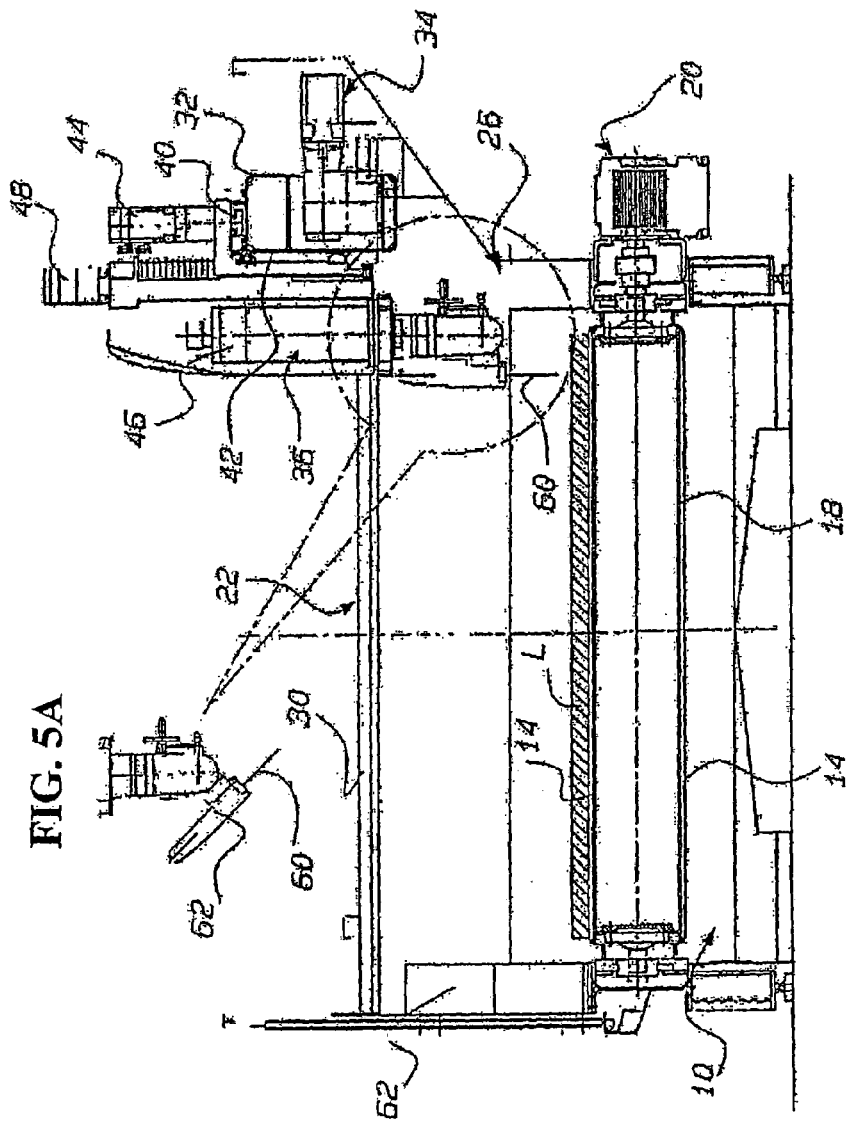
FIGS. 5 and 6 are, respectively, an end view and a top view of the machine according to FIG. 4.
Figure 6:
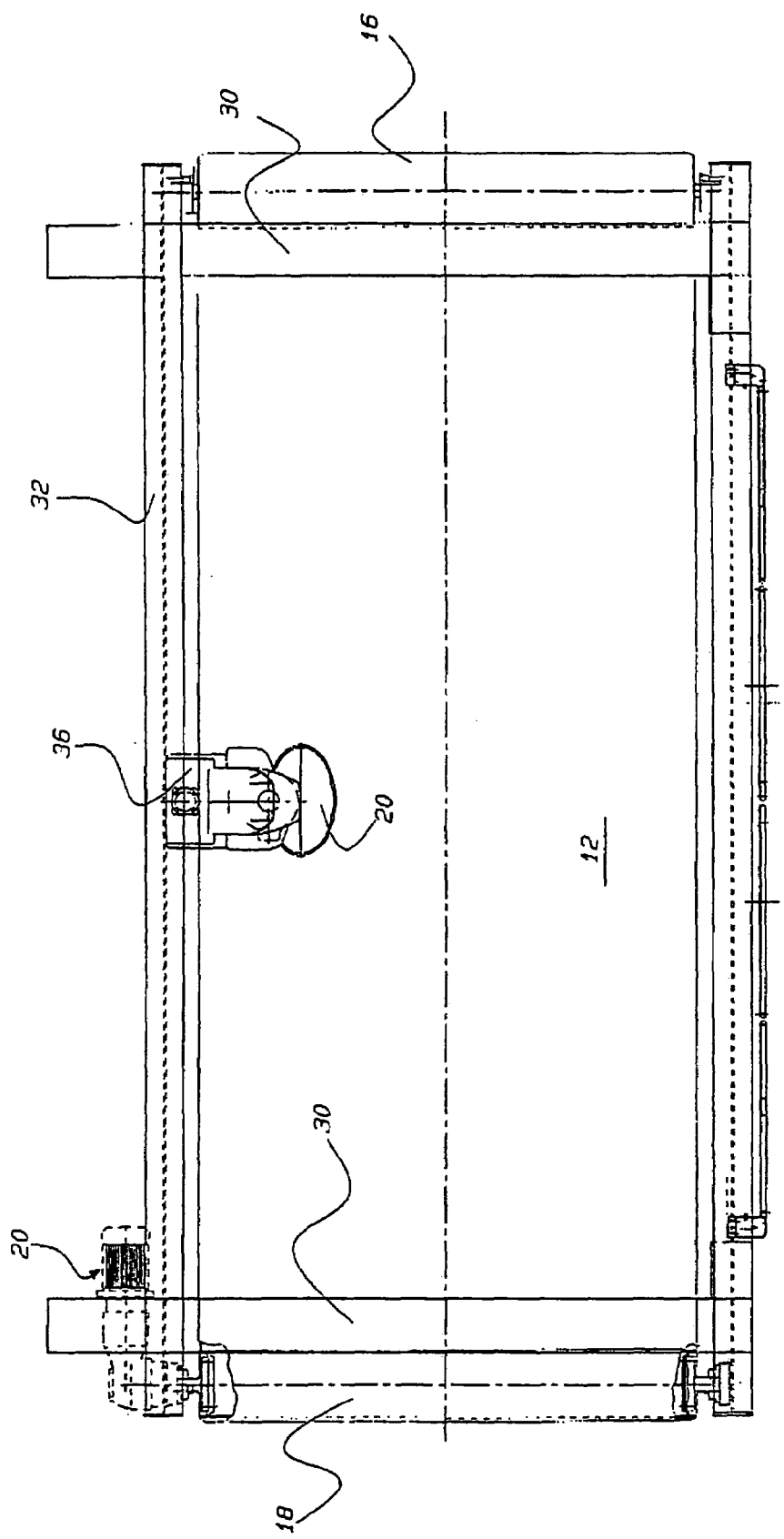

With reference first of all to FIGS. 1-3, the machine comprises a bench or base 10 on which the working surface 12 is mounted, said surface in the embodiment shown consisting of a conveyor belt for automatically feeding the rough-formed slabs to be machined and for—likewise automatically—unloading the finished articles.

In this way it also becomes possible to insert the machine according to the invention in an automatic processing line such as the line shown schematically in FIG. 7 (which will subsequently be described in greater detail) comprising an upstream station for detecting (for example by means of a scanner) the position, the form and any defects in the workpiece to undergo machining, and downstream stations where further machining operations are performed.

In the embodiment shown, the conveyor belt consists of a belt 14 which is endlessly wound onto two end rollers 16 and 18 and rotably driven by a motor unit generally indicated by the reference numeral 20.

Although not shown in detail, the conveyor belt 14 consists in reality of a strong multi-ply structure lined with a layer of elastomeric material, for example rubber, able to absorb the penetration of the tool at the end of the cutting operation, said rubber-lined belt being supported in the working zone by an underlying fixed surface, for example made of sheet metal.

The machine is bounded at the two ends, with reference to the direction (indicated by arrow F in FIG. 1) along which is fed the the workpiece being machined, by two bridge structures, generally indicated by reference numerals 22 and 24, which structures envisage two uprights 26 and 28 which are connected by a cross-member 30 extended perpendicularly with respect to the feeding direction F. From FIG. 3 it can be readily appreciated how the bridge structure allows the free passing movement of the workpieces to be machined entering the conveyor belt 14 from the right-hand end of FIG. 3 and their free unloading from the left-hand end (again with reference to FIG. 3).

A beam 32 is mounted between the two bridge structures 22 and 24 so as to be arranged parallel to the feeding direction F and movably driven along the cross-members 30 of the two bridge structures by motor means shown schematically in FIG. 2 and generally indicated by the reference numeral 34.

A spindle 36 is in turn slidably mounted along two guides 38 provided on the body of the beam 32 thanks to a pinion 40 meshing with the rack and driven by a motor 44 installed on the spindle-support carriage 42.

It must be pointed out that the above description is necessarily brief since it relates to a machine structure and to components thereof which are per se known, so that a more detailed description is not required.

Finally, the spindle 36, which is equipped with an internal drive system 46 for rotation of its shaft, is connected to a motor unit 48 which has the function of displacing vertically in an adjustable manner the spindle and hence its bottom end with respect to the position of the surface of the conveyor belt 14.

From the above description it can be readily appreciated that the position of the bottom end of the spindle 36 is adjustable so as to be positioned everywhere over the working surface 12: this is achieved by suitably displacing the beam 32 transversely with respect to the working surface and sliding the spindle 36 along said beam 32.

In FIG. 1, the spindle 36 is shown in a possible position with, associated at the bottom, a machining head 50 which is also of a conventional type, said spindle being able to receive, mounted thereon, a tool or a tool-support head from among the plurality of tools available in the tools magazine: In FIG. 3, reference numerals 52 indicate a plurality of tools and reference numerals 54 a plurality of tool-support heads for performing a cutting operation.

When for example it is required to perform a predetermined machining operation, for example a cutting operation, the spindle 36 is brought into alignment with the tools magazine, after which, with the aid of the usual automatic tool and/or head changing mechanism, such as those normally used in numerically controlled operating machines, the desired cutting head 54 is picked up from the magazine.

Then the spindle is brought into the operating position and, descending vertically, brings the cutting head or other tool into contact with the slab being machined (indicated in the figures by the reference letter L). At the end of the machining operation, the semi-finished slab is unloaded and/or the tool-support head is replaced with another tool and another machining operation is performed.

From the above description it can be readily understood that, by the machine according to the present invention, it is possible:

(i) to perform cutting operations in any direction with respect to that indicated by arrow F, due to the fact that the machining head may be rotated through 360° with respect to and about the vertical axis of the spindle and positioned at any angle so that the cut may be parallel, perpendicular or also oblique, since there is an interpolation of the movement of the beam with the movement of the spindle-support carriage;

(ii) to perform, after the cutting operation, other machining operations, using the tools magazine with which the machine is equipped;

(iii) to work in line, since the slab L to be machined, supplied for example from a sawing step, enters into the machine of the invention from one end, undergoes the desired operation(s) and machining step(s), such as cutting, and finally is transferred to the subsequent working stations positioned along the same processing line where it is submitted to any other machining operations.

FIGS. 4, 5, 5A and 6 show the same machine described above (so that the same parts are indicated by the same reference numerals used in FIGS. 1-3), with the difference that the tools magazine is missing since in this case the bottom end of the spindle has permanently fixed to it a cutting disk 60, partially screened by the usual tool protection system (disk-cover case) 62.

In this case a tools magazine comprising tools 52 and cutting heads 54 is missing, while the cutting disk 60 is permanently supported at the bottom end of the spindle 36 through the conventional driving system for transferring the rotational movement to the disk 60.

Moreover, the disk 60 is movable in a continuous manner from the position where it lies on a plane perpendicular to the working plane (and consequently of the surface of the slab or workpiece) to a position parallel to the working plane with the possibility of being adjustably arranged through intermediate positions in case that the cuts to perform are inclined with respect to the surface of the slab.

Such an inclined position is shown in FIG. 5A.

Obviously the possibility of rotating the bottom end of the spindle adjustably through 360° about the vertical axis of the spindle, positioning it at any angle, together with the possibility of interpolating, by means of numerical control, the displacements of the beam and the spindle-support carriage, allows cuts to be made in the slab L with any orientation relative to the working plane and therefore to the longitudinal direction along which the slab L is fed, namely cuts parallel, perpendicular and obliquely oriented with respect to said direction.

Figure 7:
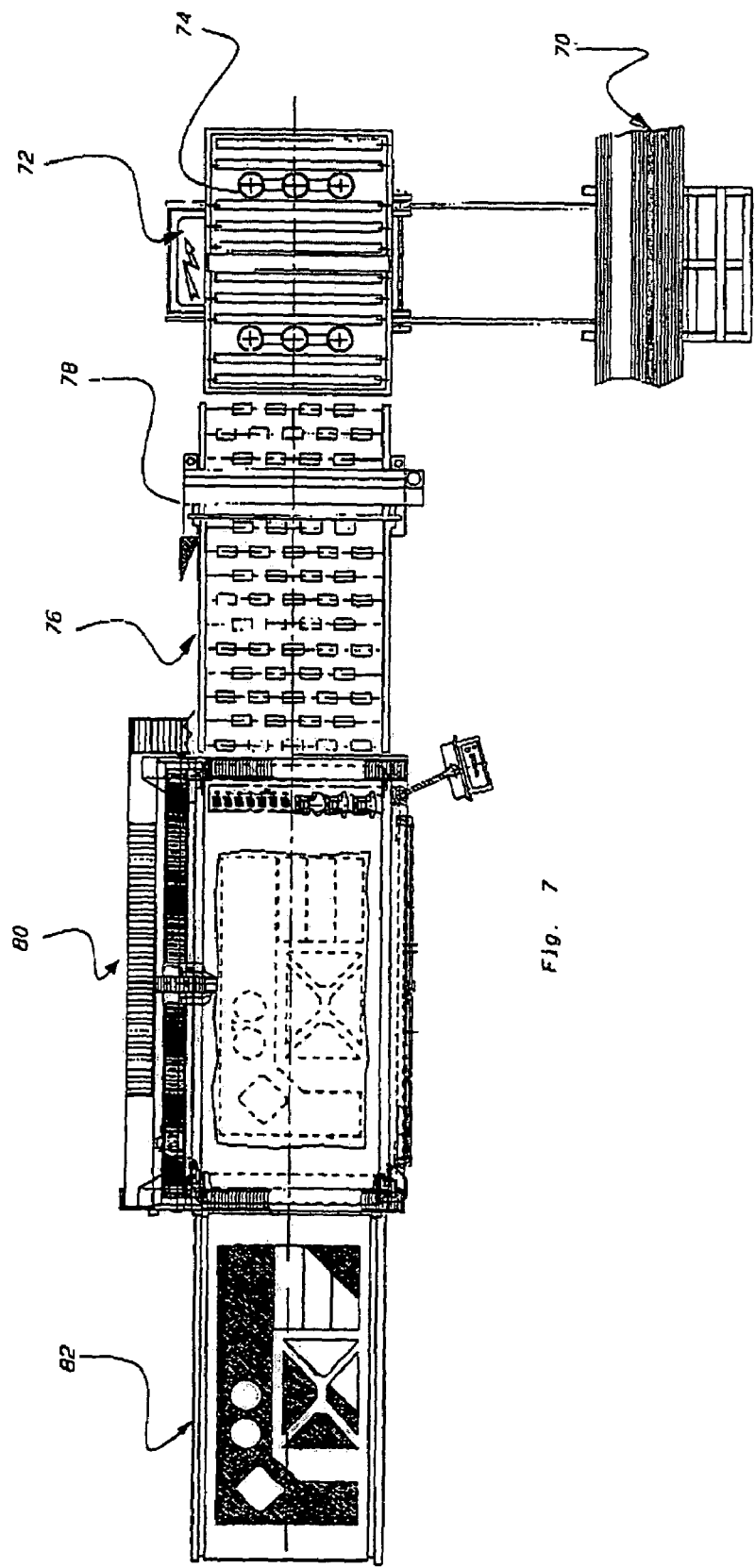
FIG. 7 is a schematic view of a processing line for machining slabs of stone material, in which the machine according to the present invention is inserted.

Finally, FIG. 7 shows a typical processing line, comprising a store containing rough-formed slabs (i.e. those resulting from sawing of blocks or from the production of sheets of conglomerate) indicated by reference numeral 70, while reference numeral 72 indicates generically an apparatus for automatically picking one slab at a time from the store 70 and loading it onto a motor-driven first rollerway 74.

The rollerway 74 is aligned with the processing line and is connected at its downstream end to a second rollerway 76 above which a bridge-type structure houses a slab reading and detection device 78, for example of the laser type, able to detect the arrangement, the profile and any defects in each slab and to transfer the data detected to a processing unit which, taking into account also the forms and dimensions of finished articles to be produced, determines the machining cycle to be performed in the station 80 which consists of a machine according to that shown in FIGS. 1-3.

At the end of machining, the completed slab is transferred to an unloading station in order to perform, where necessary, further finishing operations.

As already mentioned at the station 80, with the machine according to FIGS. 1-3, it is possible to perform both cutting operations (including inclined cuts) and other machining operations, such as, for example, forming holes or shaped apertures in the rough-formed slab and/or undercuts, etc.

From the above description it can be understood how, by the present invention relating to a numerical control machine with interpolated axes, the abovementioned object is achieved, together with the following advantages:

the same machine is able to perform all types of cuts, namely with any orientation and inclination, on rough-formed slabs of stone material, so that it is optimally used in relation to the types and dimensions of the desired articles;

other machining operations can be combined with the cutting operation, in the manner indicated above, so as to obtain articles which are finished or in any case at an advanced stage of processing;

the machine is able to be inserted in a continuous processing line, with relevant savings in terms of both machining time and investment costs.

The above description of the present invention is not intended to be limiting, in the sense that equivalent modifications of components of the machine are regarded as included within the scope of the appended claims.

The invention claimed is:

1. Machine for processing workpieces in slab form, chosen from among slabs of natural stone materials, ceramic materials and agglomerates, of the type comprising a working surface (12) for supporting the slabs (L) to be machined, two bridge structures (22, 24) parallel to each other and mounted at the respective ends of said working surface (12), a beam (32) extending between the said two bridge structures (22, 24) and slidably mounted thereon so as to perform displacements perpendicularly with respect to a longitudinal direction of the working surface, and at least one spindle (36) with a vertical axis movable vertically with respect to the working surface (12) and slidably supported by said beam (32), said at least one spindle (36) being able to receive at its bottom end at least a cutting disk, wherein said working surface consists of a conveyor belt movable perpendicularly to said bridge structures and parallel to the beam supporting the spindle;

said bottom end of the at least one spindle (36) is rotatable in a controlled and adjustable manner so as to assume any position ranging between 0° and 360° about its own vertical axis; and the machine is provided with a numerical control system with interpolated axes for controlling the operations thereof.

2. Machine for processing material in slab form according to claim 1, characterized in that said conveyor belt (14) is a multi-ply belt with a lining of elastomeric material which is supported, in the working zone, by an underlying fixed surface made of sheet metal.

3. Machine for processing material in slab form according to claim 1, wherein a bottom end of the at least one spindle (36) is also continuously rotatable between 0 and 90° about a horizontal axis perpendicular to the vertical axis of the spindle and the cutting disk (60) is adjustably fixed in a position intermediate between 0 and 90° to perform cuts which are inclined with respect to a surface of the slabs.

4. Machine for processing material in slab form according to claim 1, wherein each of the said bridge structures (22, 24) comprises two uprights (26, 28) and a cross-member (30), the distance between the uprights allowing the free passing movement of the slabs while they are loaded onto the machine and while they are unloaded therefrom.

5. A machine for processing a workpiece in slab form, the machine comprising:
a working surface for supporting the workpiece;
a first and a second bridge structure, the structures parallel to each other and mounted at respective ends of the working surface;
a beam extending between the first and second bridge structures, the beam slidably mounted thereon for displacing perpendicularly with respect to a longitudinal direction of the working surface;
a spindle movable along a vertical axis of relative to the working surface, the spindle slidably supported by the beam,
a cutting disk received at a bottom end of the spindle;
wherein the working surface consists of a conveyor belt movable perpendicular to the bridge structures and parallel to the beam;
wherein the bottom end of the spindle is rotatable in a controlled and adjustable manner to assume any position ranging between 0° and 360° about its own vertical axis; and
wherein a numerical control system with interpolated axes for controlling the operations of the bottom end of the spindle is provided.

* * * * *